United States Patent [19]

Dupont et al.

[11] 4,420,180

[45] Dec. 13, 1983

[54] AUTOMOBILE FLOOR MAT WITH MOISTURE COLLECTING FEATURE

[75] Inventors: Andre' Dupont, Longueuil; Paul Laurent, Boucherville; Bernard Beaujardin, Montreal, all of Canada

[73] Assignee: Creations 2000, Inc., Longueuil, Canada

[21] Appl. No.: 347,915

[22] Filed: Feb. 11, 1982

[51] Int. Cl.³ .............................................. B60N 3/04
[52] U.S. Cl. .................................... 296/1 F; 15/215; 428/169
[58] Field of Search .......................... 296/1 F; 15/215; 428/167, 169

[56] References Cited

U.S. PATENT DOCUMENTS

| | | | |
|---|---|---|---|
| 3,387,315 | 6/1968 | Stata | 296/1 F |
| 3,401,975 | 9/1968 | Oger | 296/1 F |
| 4,188,058 | 2/1980 | Resa et al. | 296/1 F |
| 4,211,447 | 7/1980 | Di Vincenzo | 296/1 F |
| 4,280,729 | 7/1981 | Morawski | 296/1 F |

FOREIGN PATENT DOCUMENTS

| | | | |
|---|---|---|---|
| 1530606 | 10/1969 | Fed. Rep. of Germany | 296/1 F |
| 2165874 | 7/1973 | Fed. Rep. of Germany | 296/1 F |

*Primary Examiner*—Henry F. Epstein
*Attorney, Agent, or Firm*—Schwartz, Jeffery, Schwaab, Mack, Blumenthal & Koch

[57] ABSTRACT

The floor mat comprises a main portion for lying flat on an automobile floor and an upwardly inclined portion for lying on an inclined surface within the automobile, such as behind the pedals. The main portion includes a centrally disposed downwardly recessed area forming a pan having a floor and surrounding sides for catching fluid. A plurality of ridges, having a triangular cross-section, rise vertically from the floor of the pan for holding pants and the like above fluids caught in the pan. The forwardly extending portion includes ribs which extend in the longitudinal direction of the mat for channeling fluids backward into the pan. Additional ribs are formed on the forward portion which are inclined downwardly and inwardly for channeling fluid away from the edges of the mat toward the center of the mat.

5 Claims, 4 Drawing Figures

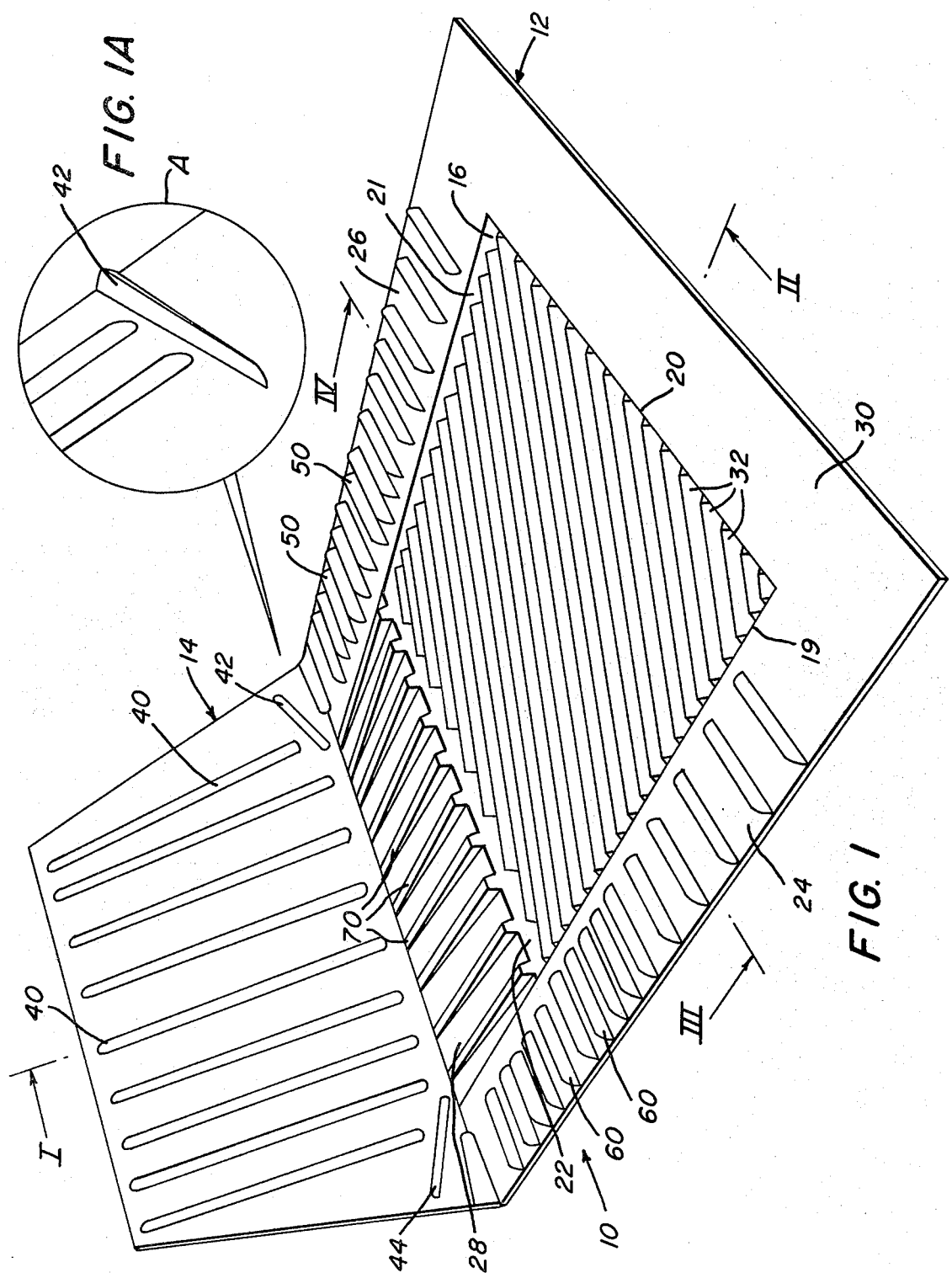

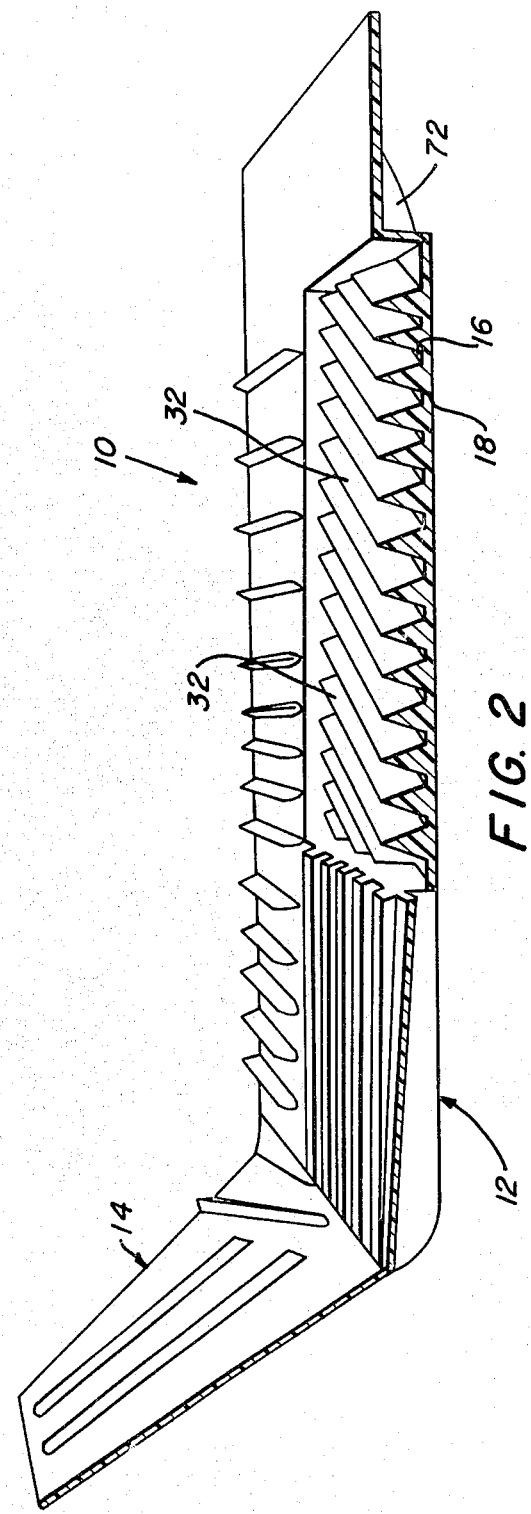
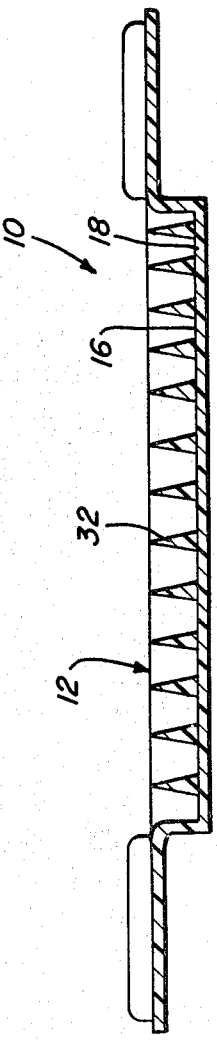

AUTOMOBILE FLOOR MAT WITH MOISTURE COLLECTING FEATURE

BACKGROUND OF THE INVENTION

1. Field of the Invention

This invention relates to floor mats for automobiles and especially two such floor mats which are designed to protect trouser legs from damage due to water, calcium and mud.

2. Discussion of Related Art

Automobile floor mats are well known and used often to protect the carpeting in an automobile from damage due to wear, moisture and dirt. However, the standard floor mat has a major disadvantage in that the elements from which the carpeting is protected build up on the floor mat and may cause damage to clothing of the occupants of the automobile. For example, during wet weather, moisture and mud built up on the footwear of the automobile driver will accumulate on the main part of a floor mat and easily be absorbed in the leg of the driver's trousers. Accordingly, there is need of a floor mat which protects against such damage.

SUMMARY OF THE INVENTION

One object of the present invention is to provide a floor mat which traps moisture in an area which is relatively inaccessible to the clothing of a user of the floor mat.

A further object of the present invention is to provide an automobile floor mat in which the build up of calcium, other minerals and mud is confined to an area which does not contact the trousers of a user of the floor mat.

A further object of the present invention is to provide an automobile floor mat which is easily removable for cleaning in order to facilitate the removal of accumulated debris.

A still further object of the present invention is to provide an automobile floor mat in which all moisture, etc., is channeled to a central location.

In accordance with the above and other objects, the present invention is an automobile floor mat comprising a main portion for lying flat on an automobile floor. The main portion includes a centrally disposed downwardly recessed area forming a pan having a floor and surrounding sides for catching fluid. A plurality of ridges rise vertically from the floor of the pan for holding pants and the like above fluid which is caught in the pan. The mat also includes a portion which extends forwardly in the longitudinal direction of the mat and inclines upwardly for lying on an inclined floor surface, for example, behind the pedals of a vehicle. A plurality of ribs are formed on the inclined forward portion. These ribs extend along the inclined forward portion for directing fluid downwardly toward the pan.

The ridges formed in the pan are triangular in cross-section. The base of each triangular ridge is connected to the floor of the pan and the apex of each ridge points upwardly for inhibiting the formation of calcium and other minerals in a position in which they could contact clothing of the user. The ridges extend obliquely to the longitudinal direction of the mat so that fluid accumulated in the pan will not splash upwardly onto the clothing of a user.

The main portion also includes a peripheral edge surrounding the pan. The peripheral edge comprises side edges which extend longitudinally of the mat and have ribs extending perpendicular to the longitudinal direction of the mat. A forward edge portion is disposed between the pan and the upwardly inclined forward portion. Ribs are formed on the forward edge portion which extend parallel to the longitudinal direction of the mat.

The ribs formed on the inclined portion are divided into a first set which extend parallel to the longitudinal direction of the mat and the second set which comprise ribs which are inwardly inclined and disposed below certain of the longitudinal ribs for channeling fluid into the pan.

BRIEF DESCRIPTION OF THE DRAWINGS

The above and other objects of the invention will become more readily apparent as the invention becomes more clearly understood in connection with the detailed description set forth below, and the accompanying drawings in which like reference numerals represent like parts throughout and in which:

FIG. 1 is a perspective view of the floor mat of the present invention;

FIG. 1A is an enlarged view of one inclined rib on the forward portion of the floor mat;

FIG. 2 is a longitudinal section, perspective view of the floor mat taken along line I-II of FIG. 1; and FIG. 3 is a transverse sectional view taken along section line III-IV of FIG. 1.

DETAILED DESCRIPTION OF THE PREFERRED EMBODIMENT

With reference to the drawings, the floor mat 10 comprises a main portion 12 and an inclined forward portion 14. Main portion 12 is designed to lie flat on the floor of an automobile in the passenger compartment. Inclined portion 14 rests on an inclined portion of the automobile floor, as for example, the portion lying behind the pedals of the automobile.

Main portion 12 contains a centrally disposed pan 16 which is designed to catch moisture in the form of water, mud, etc., which would otherwise accumulate on the trouser legs of the automobile occupants. Pan 16 has a floor 18 and four sidewalls 19–22. The pan is generally rectangular in configuration and has a depth of approximately ½ inch.

The main portion of the mat also includes a peripheral edge portion including left and right peripheral edges 24, 26 respectively, and forward and rear edge portions 28, 30, respectively. These edges extend from the top of the respective sidewalls and can be supported in any convenient manner. Edges 24, 26 and 30 are designed to lie relatively horizontal. Forward edge 28 is inclined slightly for the purpose of channeling fluid from forward portion 14 to pan 16.

Pan 16 contains a plurality of vertical ridges 32 which are triangle in cross-section. The base of each triangular ridge is connected to pan floor 18, while the apex of each triangular ridge points upwardly. The ridges have approximately the same height as the pan and form a support which keeps the trousers of a user from contacting the pan floor 18 which contains fluid or the like. The purpose of the triangular cross-section shape is to inhibit the formation of calcium and other mineral deposits as well as hardened mud and the like on the top of the ridges. Any such formations will develop on the lower portion of the ridges out of reach of the user's clothing. Any formations which develop on the ridge apexes will be quickly knocked off by vibrations or movement of the user's feet and therefore will not contact the user's clothing.

Pan 16 is generally rectangular in configuration and the ridges 32 extend obliquely to the longitudinal direction of the mat 10. The longitudinal direction of the mat is also the direction of movement of an automobile in which the mat would be disposed. Consequently, automobile movements will cause liquid within pan 16 to flow between ridges 32 in an even movement rather than rapidly contact a surface perpendicular to the direction of movement. In this manner, the ridges help to suppress fluid agitation or splashing which might cause to soil the trousers of a user. It can be seen, therefore, that ridges 32 act as a hindrance to clothing entering pan 16 and also act as a hindrance to fluid within the pan splashing out onto the clothing due to violent movement of the automobile. In order to enhance this effect, the ridges should be relatively close together so that the ridge apexes are approximately $\frac{1}{4}$ inch apart.

Forward portion 14 contains ribs 40 which extend along that portion generally in the longitudinal direction of the mat. These ribs ensure that clothing will not contact the portion of the mat between the ribs and also act to channel liquid downwardly along portion 14 toward pan 16. On the right and left hand sides of portion 14 there are downwardly and inwardly inclined ribs 42 and 44, respectively. Ribs 42 and 44 are disposed below certain of the longitudinal ribs 40 and ensure that fluid flowing down forward portion 14 will be channeled toward the center of main portion 12 and enter pan 16 rather than flow off the sides of the mat and remain stagnantly on the floor of the vehicle.

On the left and right edges 24, 26, respectively, additional ribs 60 and 50, respectively, are formed. These ribs are formed vertically on the edges and extend perpendicular to the longitudinal direction of the mat. Ribs 60 and 50 help to channel water toward the center of the mat and prevent clothing from contacting the damp edges of the mat, especially during movement of the legs of the user. During movement, as for example normal pedal actuation while driving, one tends to move his legs in a manner which would drag clothing across the edges of the mat. Ribs 50 and 60 cause the clothing to be lifted above the main portion of the edges and thus dangling clothing avoids contact with the damp portion of the mat.

Ribs 50 and 60 may be triangular in cross-section also, to reduce the likelihood of formation of calcium or other mineral deposits in a position which may contact clothing.

Ribs 70 are formed on the forward edge 28 of the mat and channel fluid from forward portion 14 directly into pan 16. Ribs 70 also provide support for the driver's feet.

The entire mat can be made from any suitable material, such as vinyl, rubber, or the like. The mat can be formed in a unitary construction and should contain sufficient structural components to ensure its rigidity. For example, gussets, such as shown at 72 in FIG. 2, may be located between the pan 16 and peripheral edge in order to support the peripheral edge.

The above description is meant to be illustrative but not limitative of the invention. Clearly, numerous modifications, additions and other changes may be made without departing from the scope of the invention, as set forth in the apended claims.

What is claimed is:

1. An automobile floor mat comprising:
    a main portion for lying flat on an automobile floor, said main portion comprising a centrally disposed, downwardly recessed area forming a pan for catching fluid, said pan having a floor and surrounding sides; a plurality of ridges rising vertically from said pan floor for holding clothing above said floor; and
    an inclined forward portion extending in the longitudinal direction of said mat for lying on an inclined surface of said automobile, for example, the surface behind the pedals of the automobile; a plurality of ribs being formed on said inclined forward portion, said ribs extending along said pan,
    wherein each of said ridges has a generally triangular upper portion with the apex of each ridge pointing upwardly and the base of each ridge being connected to said pan floor.

2. An automobile floor mat comprising:
    a main portion for lying flat on an automobile floor, said main portion comprising a centrally disposed, downwardly recessed area forming a pan for catching fluid, said pan having a floor and surrounding sides; a plurality of ridges rising vertically from said pan floor for holding clothing above said floor; and
    an inclined forward portion extending in the longitudinal direction of said mat for lying on an inclined surface of said automobile, for example, the surface behind the pedals of the automobile; a plurality of ribs being formed on said inclined forward portion, said ribs extending along said inclined portion toward said pan for directing fluid toward said pan,
    wherein said ridges extend obliquely to the longitudinal direction of said mat prohibiting splashing of fluid in said pan.

3. The floor mat of claim 1 or 2, wherein said main portion further includes a peripheral edge surrounding said pan, said peripheral edge including side edge portions extending in the longitudinal direction of said mat and having ribs extending perpendicular to said longitudinal direction.

4. The floor mat of claim 3, wherein said peripheral edge includes a forward edge portion having ribs extending parallel to said longitudinal direction.

5. An automobile floor mat comprising:
    a main portion for lying flat on an automobile floor, said main portion comprising a centrally disposed, downwardly recessed area forming a pan for catching fluid, said pan having a floor and surrounding sides; a plurality of ridges rising vertically from said pan floor for holding clothing above said floor; and
    an inclined forward portion extending in the longitudinal direction of said mat for lying on an inclined surface of said automobile, for example, the surface behind the pedals of the automobile; a plurality of ribs being formed on said inclined forward portion, said ribs extending along said inclined portion toward said pan for directing fluid toward said pan,
    wherein said inclined portion includes a first set of ribs extending in the longitudinal direction of said mat and additional ribs which are inclined downwardly and inwardly of said mat, said additional ribs being disposed below certain of said longitudinally extending inclined portion ribs for channeling fluids away from the edges of said mat and toward the center of said mat.

* * * * *